United States Patent [19]
Hedeen

[11] Patent Number: 5,316,079
[45] Date of Patent: May 31, 1994

[54] INTEGRATED HEAT EXCHANGER

[75] Inventor: Randall E. Hedeen, Snohomish, Wash.

[73] Assignee: Paccar Inc, Bellevue, Wash.

[21] Appl. No.: 17,464

[22] Filed: Feb. 12, 1993

[51] Int. Cl.⁵ .................................................. F28F 9/00
[52] U.S. Cl. .................................... 165/140; 165/67; 60/599; 123/563; 180/68.4
[58] Field of Search .............. 165/140, 67; 123/41.49, 123/41.51, 563; 180/68.4; 60/599

[56] References Cited

U.S. PATENT DOCUMENTS

| | | | |
|---|---|---|---|
| 2,204,447 | 6/1940 | Samans | 257/224 |
| 2,535,047 | 12/1950 | Dalin et al. | 257/235 |
| 2,856,760 | 10/1958 | Walter | 62/285 |
| 3,147,084 | 9/1964 | Franzen et al. | 23/288 |
| 3,165,151 | 1/1965 | Astrup et al. | 165/81 |
| 3,211,362 | 10/1965 | Laskey et al. | 230/116 |
| 3,294,161 | 12/1966 | Wood | 165/140 |
| 3,712,282 | 1/1973 | Isley | 123/119 CD |
| 3,763,830 | 10/1973 | Robinson et al. | 122/4 D |
| 4,371,033 | 2/1983 | Stendahl | 165/104.16 |
| 4,436,145 | 3/1984 | Manfredo et al. | 165/67 |
| 4,452,216 | 6/1984 | Patchen, II et al. | 123/563 |
| 4,531,574 | 7/1985 | Hoch | 165/67 |
| 4,562,697 | 1/1986 | Lawson | 60/599 |
| 4,651,816 | 3/1987 | Struss et al. | 165/140 |
| 4,702,079 | 10/1987 | Saito et al. | 60/599 |
| 4,785,788 | 11/1988 | Targa Pascual | 123/563 |
| 4,916,902 | 4/1990 | Pratt et al. | 60/599 |
| 4,923,001 | 5/1990 | Marcolin | 165/140 |
| 4,997,033 | 3/1991 | Ghiani et al. | 165/67 |
| 5,046,554 | 9/1991 | Iwasaki et al. | 165/140 |
| 5,095,882 | 3/1992 | Christensen | 123/563 |
| 5,123,480 | 6/1992 | Dixit | 165/104.16 |

FOREIGN PATENT DOCUMENTS

| | | | |
|---|---|---|---|
| 610005 | 12/1960 | Canada | 165/140 |
| 568295 | 3/1945 | United Kingdom | 165/140 |

*Primary Examiner*—John Rivell
*Assistant Examiner*—L. R. Leo
*Attorney, Agent, or Firm*—Seed and Berry

[57] ABSTRACT

An integrated heat exchanger includes a first heat exchange core adapted for cooling a first heat exchange fluid and a second heat exchange core adapted for cooling a second heat exchange fluid. A first pair of fluid manifolds supports the first and second heat exchange cores and communicates with the first heat exchange core to allow the first heat exchange fluid to pass between the first pair of fluid manifolds and the first heat exchange core. A second pair of fluid manifolds supports the first and second heat exchange cores and communicates with the second heat exchange core to allow the second heat exchange fluid to pass between the second pair of fluid manifolds and the second heat exchange core. The first and second pairs of fluid manifolds form a quadrilateral support structure with each fluid manifold forming a side of the support structure. The fluid manifolds of the first pair of fluid manifolds are positioned on opposite sides of the support structure and are each connected between the second pair of fluid manifolds. Preferably, the first heat exchange core is a coolant radiator core adapted to use a liquid as the first heat exchange fluid and the second heat exchange core is a charge air cooler core adapted to use compressed gas as the second heat exchange fluid. The coolant radiator core has a perimeter that defines a front face of the coolant radiator core, the charge air cooler core is positioned in front of the coolant radiator core, and the second pair of fluid manifolds is positioned outside of the perimeter of the coolant radiator core.

11 Claims, 2 Drawing Sheets

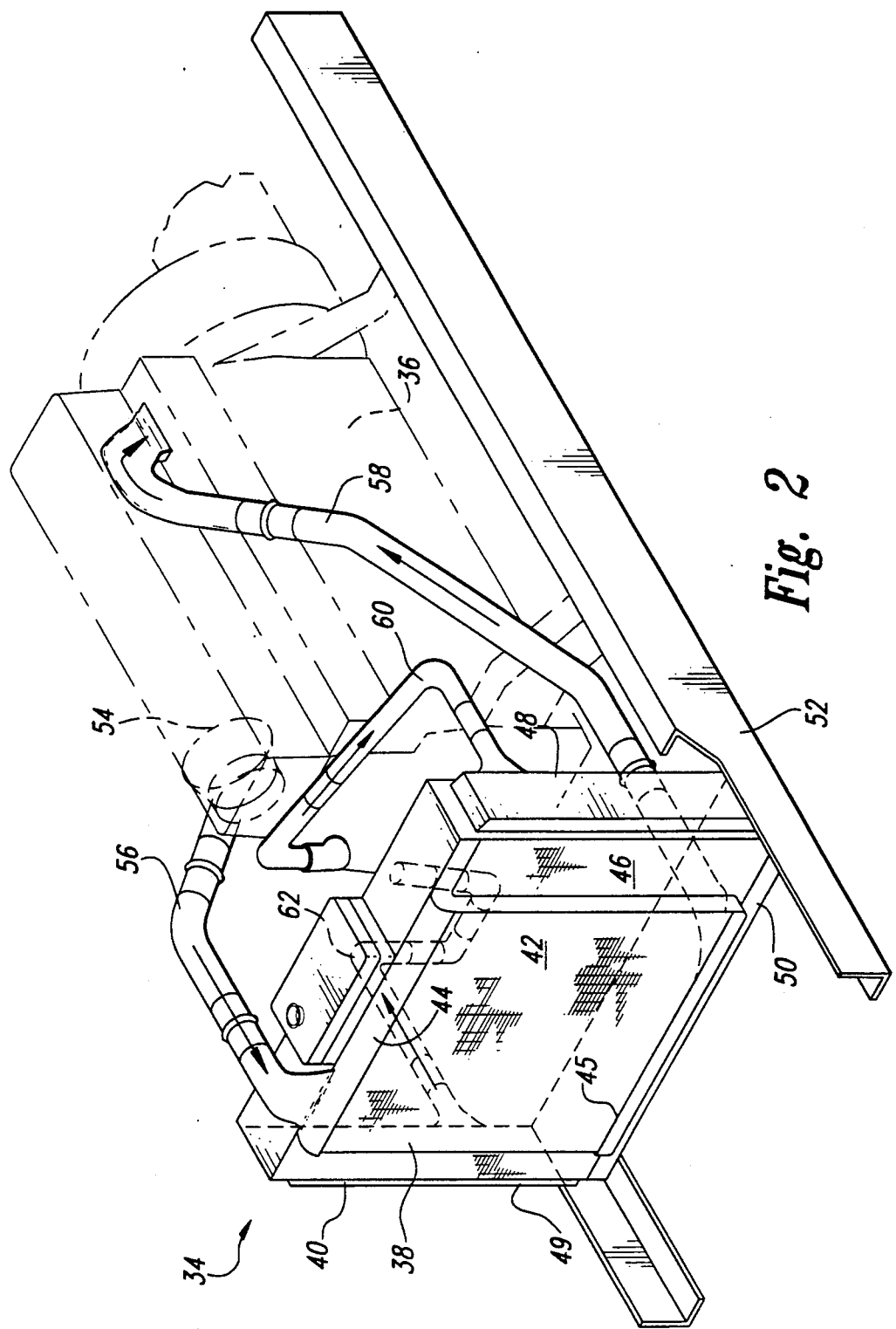

INTEGRATED HEAT EXCHANGER

TECHNICAL FIELD

The present invention relates to cooling systems for internal combustion engines and, more particularly, to an integrated heat exchanger incorporating at least two heat exchangers into one structure.

BACKGROUND OF THE INVENTION

The supercharging of internal combustion engines consists of increasing the inlet pressure to the engine cylinders so as to obtain an improved charge to the cylinders and hence a higher effective pressure, resulting in an increase of power for the same speed. While supercharging advantageously improves air pressure in the cylinders, it disadvantageously increases the air temperature in the cylinders.

In a supercharged internal combustion engine, a charge air cooler is advantageously arranged downstream of the supercharger, such as a turbocharger, to decrease the temperature of air introduced into the engine from the turbocharger. The decreased air temperature decreases the occurrence of knocking, even when a high compression ratio is employed. Furthermore, the air density is increased and thus the volumetric efficiency is increased. Due to the high compression ratio and high volumetric efficiency, an increased engine power is obtained, which is the intrinsic object of employing a supercharged system.

In addition to a charge air cooler, a supercharged internal combustion engine includes a conventional coolant radiator that prevents the engine from overheating. The coolant radiator and the charge air cooler operate similarly, the main difference being that the coolant radiator employs a liquid coolant as a heat exchange fluid while the charge air cooler employs compressed gas as the heat exchange fluid. Typically the radiator and charge air cooler have manifolds or tanks on opposite sides of a heat exchange core. These manifolds direct the heat exchange fluid into cooling tubes in the heat exchange core. Air flows between the cooling tubes to cool the heat exchange fluid when the vehicle moves in a forward direction or when a fan is turned on.

Shown in FIG. 1 is a conventional design of a coolant radiator/charge air cooler system 10. The system includes a charge air cooler 12 having a cooler core 14 connected between a pair of cooler manifolds 16. Likewise, a coolant radiator 18 includes a radiator core 20 connected between a pair of radiator side tanks 22.

When the vehicle travels forward, or when a fan (not shown) is turned on, air passes through the charge air cooler core 14 and the radiator core 20 to cool the heat exchange fluids in the cores. However, the charge air cooler 12 typically is positioned in front of the coolant radiator 18 and is typically smaller than the coolant radiator so that the cooler manifolds 16 block a portion of the radiator core 20, thereby decreasing the flow of cooling air through the radiator core. By blocking some of the air through the radiator core the charge air cooler prevents the coolant radiator from operating at optimum efficiency.

The charge air cooler and coolant radiator are supported by a support structure 24. The support structure includes top and bottom horizontal support channels 26 connected between left and right vertical side tanks 22. The support structure also includes structural cross members 30 extending between opposite corners of the support structure. The charge air cooler 12 is attached to the support structure via side brackets 32. In addition to adding undesirable weight to the system, a portion of support structure blocks a portion of the radiator core, thereby further decreasing coolant radiator efficiency.

SUMMARY OF THE INVENTION

The present invention is directed to an integrated heat exchanger that overcomes the disadvantages of the prior art by providing structural efficiency as well as cooling efficiency. In a preferred embodiment, the integrated heat exchanger includes a first heat exchange core adapted for cooling a first heat exchange fluid and a second heat exchange core adapted for cooling a second heat exchange fluid. A first pair of fluid manifolds supports the first and second heat exchange cores and communicates with the first heat exchange core to allow the first heat exchange fluid to pass between the first pair of fluid manifolds and the first heat exchange core. A second pair of fluid manifolds supports the first and second heat exchange cores and communicates with the second heat exchange core to allow the second heat exchange fluid to pass between the second pair of fluid manifolds and the second heat exchange core. The first and second pairs of fluid manifolds form a quadrilateral support structure with each fluid manifold forming a side of the support structure. By forming a support structure with the fluid manifolds the integrated heat exchanger is efficiently supported without needing a separate support frame.

In the preferred embodiment, the second heat exchange core is positioned in front of the first heat exchange core, but the fluid manifolds are positioned outside of the perimeter of a front face of the first heat exchange core. By positioning the fluid manifolds outside of the perimeter of the first heat exchange core, the manifolds do not to impede the flow of air through the first heat exchange core. Preferably, the first heat exchange core is a coolant radiator core adapted to use a liquid as the first heat exchange fluid and the second heat exchange core is a charge air cooler core adapted to use compressed gas as the second heat exchange fluid.

BRIEF DESCRIPTION OF THE DRAWINGS

FIG. 2 is a perspective view of an integrated heat exchanger according to the present invention as connected to a conventional internal combustion engine.

DETAILED DESCRIPTION OF THE INVENTION

Figure 1:
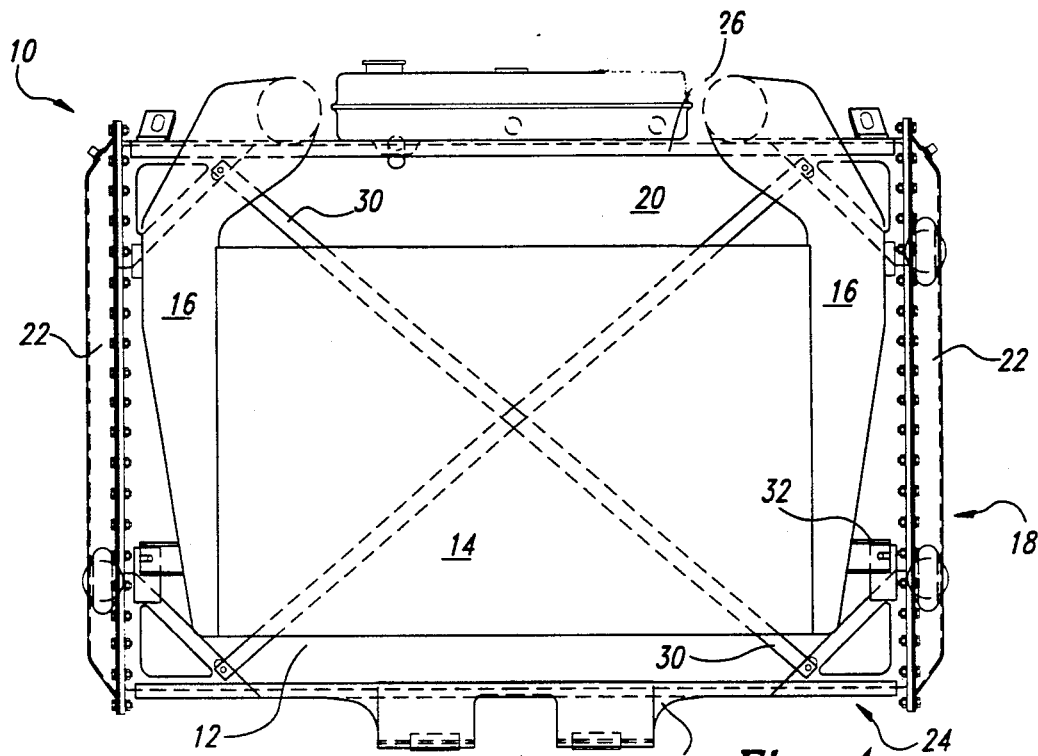
FIG. 1 is a side elevational view of a charge air cooler and coolant radiator arrangement according to the prior art.

As shown in FIG. 2, a preferred embodiment of the present invention includes an integrated heat exchanger 34 positioned forwardly of an internal combustion engine 36 of a vehicle. The integrated heat exchanger 34 includes a charge air cooler 38 structurally connected to a coolant radiator 40. The charge air cooler includes a cooler core 42 connected between a pair of cooler manifolds 44, 45. Likewise, the coolant radiator 40 includes a radiator core 46 connected between a pair of radiator manifolds 48, 49. Both the radiator manifolds and the cooler manifolds are positioned outside of the perimeter of a front face of the radiator core so that the manifolds do not block the passage of air through the radiator core. The cooler manifolds are connected between the radiator manifolds so as to form a quadrilateral support structure that allows the integrated heat exchanger to be supported without a separate support frame.

The integrated heat exchanger 34 is positioned on a cross member 50 of a vehicle frame 52 which also supports the engine 36. Attached to the engine is a turbocharger 54 which compresses gas for use by the engine cylinders (not shown) in order to improve engine efficiency. The compressed gas is passed into the upper cooler manifold 44 via an air input conduit 56. The air passes from the upper cooler manifold through the cooler core 42 to the lower cooler manifold 45. When the vehicle travels forward or when a radiator fan (not shown) is operating, ambient air passes through the cooler core and cools the compressed air in the cooler core. The cooled compressed air exits the lower cooler manifold and passes to the engine cylinders via an air output conduit 58.

As is well known, a liquid coolant is circulated through the engine 36 in order to prevent the engine from overheating. The liquid coolant passes from the engine through an input coolant conduit 60 to a first radiator manifold 48. The coolant passes from the first radiator manifold through the radiator core 46 to the second radiator manifold 49 opposite the first radiator manifold. As with the cooler core 42, ambient air passes through the radiator core and cools the coolant in the radiator core. The cooled coolant returns to the engine via an output coolant conduit 62.

Figure 3:
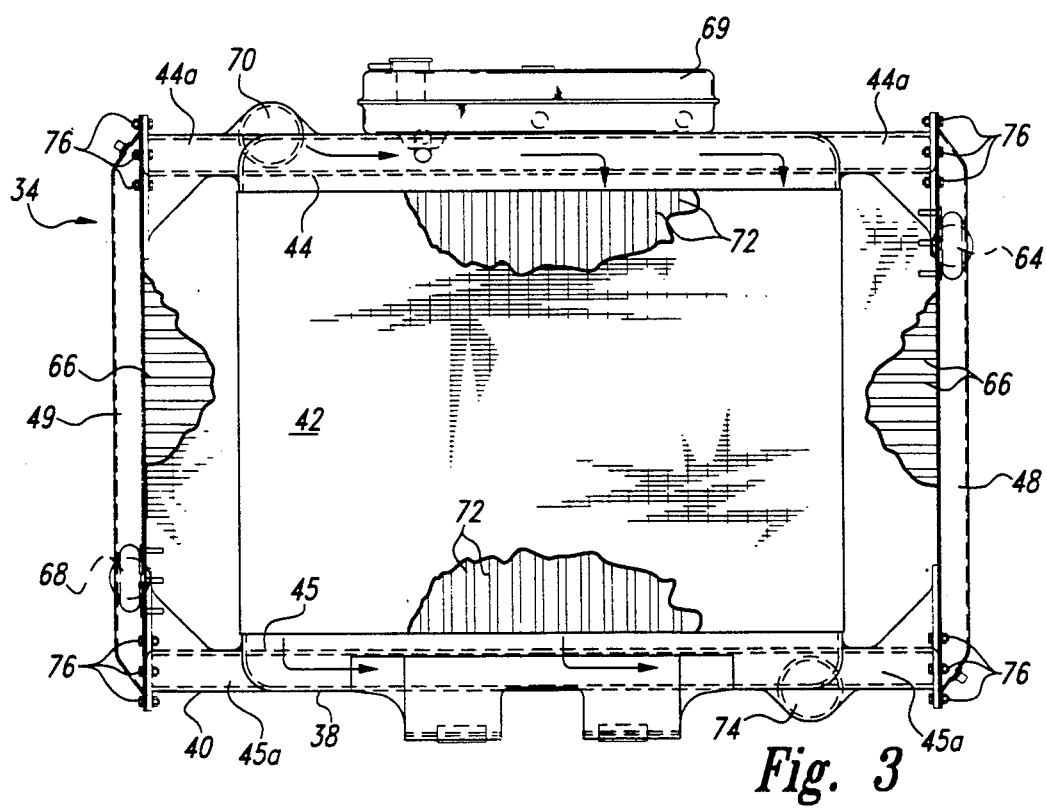
FIG. 3 is a front elevational view of the integrated heat exchanger according to the present invention.

Shown in FIG. 3 is a more detailed view of the integrated heat exchanger 34 of FIG. 2. The coolant radiator 40 includes an inlet port 64 that is adapted to functionally connect the interior of the first radiator manifold 48 to the interior of the input coolant conduit 60 shown in FIG. 2 to allow the liquid coolant to flow into the radiator manifold. Communicating with the interior of the first radiator manifold are a plurality of cooling tubes 66 extending across the radiator core 46. As the liquid coolant flows through the cooling tubes, ambient air flows through the radiator core along the outside of the cooling tubes, thereby cooling the coolant in the cooling tubes. The coolant radiator also includes an outlet port 68, which is adapted to functionally connect the interior of the second radiator manifold 49 to the interior of the output coolant conduit 62 shown in FIG. 2 to allow the cooled liquid coolant to flow into the output coolant conduit. A conventional surge tank 69 affixed to the integrated heat exchanger communicates with one of the radiator manifolds 50, 51 by a conduit (not shown) to release overheated coolant and to allow the coolant radiator 40 to be filled with liquid coolant and vented.

The charge air cooler 38 includes an input port 70 that allows compressed air from the turbocharger 54 via the air input conduit 56 to enter the upper cooler manifold 44. The compressed gas flows from the upper cooler manifold 44 through a plurality of cooling tubes 72 extending through the cooler core 42 to the lower cooler manifold 45. As the compressed gas flows through the cooling tubes, ambient air flows through the cooler core along the outside of the cooling tubes, thereby cooling the compressed gas in the cooling tubes. The cooled, compressed gas exits the lower cooler manifold through an outlet port 74 and passes to the engine 36 via the air conduit 58 shown in FIG. 2.

Shown in FIG. 3 are multiple connectors 76 which rigidly connect the radiator manifolds 48, 49 to the cooler manifolds 44, 45 to provide a rigid support structure. The cooler manifolds 44, 45 include manifold extensions 44a, 45a respectively, which connect to the radiator manifolds 48, 49 via connectors 76. The connectors 76 can be any well-known connectors, such as bolts, rivets, or welds. If additional support is desired, the walls of the manifolds can be made thicker or of a stronger material without requiring the separate support frame required by the prior art.

Those skilled in the art will appreciate that there are numerous possible integrated heat exchanger configurations that utilize the concepts of the present invention. In one alternative embodiment the positions of the cooler manifolds and radiator manifolds are reversed so that the radiator manifolds are positioned above and below the radiator core while the cooler manifolds are positioned to the left and right of the cooler core. Further, although rectangular coolant radiators and charge air coolers are typical, the invention may be employed equally satisfactorily in a system using coolant radiators and charge air coolers of any shape.

Heat exchangers other than the single pass charge air coolers and coolant radiators shown in the figures may also be used. In one embodiment, two charge air coolers are combined into one integrated heat exchanger in order to provide cooling for an engine that employs dual turbochargers. In an alternate embodiment using a doublepass charge air cooler, the upper cooler manifold and the cooler core are divided into two halves. The compressed air flows through a first half of the upper cooler manifold and cooler core to the lower cooler manifold. The lower cooler manifold directs the compressed air to the second half of the cooler core. The compressed air flows through the second half of the cooler core and the second half of the upper cooler manifold and exits through an outlet port in the second half of the upper cooler manifold.

Each of the embodiments of the invention provide improved efficiency of the integrated heat exchanger by preventing the fluid manifolds from blocking the passage of ambient air through the heat exchanging cores. Further, a second aspect of the invention provides a strong support structure for the integrated heat exchanger using the fluid manifolds. As a result, no separate support frame is needed to support the integrated heat exchanger.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:
1. An integrated heat exchanger, comprising:
   a first heat exchange core adapted for cooling a first heat exchange fluid and having a perimeter that defines a front face of the first heat exchange core;
   a second heat exchange core adapted for cooling a second heat exchange fluid and positioned in front of the first heat exchange core; and
   an integrated, self-supporting, peripheral support structure supporting the heat exchange cores on a motor vehicle frame, the support structure including:

a first pair of fluid manifolds supporting the heat exchange cores and communicating with the first heat exchange core to allow the first heat exchange fluid to pass between the first fluid manifolds and the first heat exchange core; and a second pair of fluid manifolds coupled to and extending between the first fluid manifolds, thereby forming the peripheral support structure supporting the heat exchange cores, the second fluid manifolds communicating with the second heat exchange core to allow the second heat exchange fluid to pass between the second fluid manifolds and the second heat exchange core, the second fluid manifolds being positioned outside of the first heat exchange core perimeter;

wherein the first and second fluid manifolds are of sufficient strength to support the fluid manifolds and the heat exchange cores without additional structural frame support.

2. The integrated heat exchange of claim 1 wherein the first heat exchange core is a coolant radiator core adapted to use a liquid as the first heat exchange fluid.

3. The integrated heat exchanger of claim 2 wherein the second heat exchange core is a charge air cooler core adapted to use compressed gas as the second heat exchange fluid.

4. The integrated heat exchanger of claim 1 wherein the first and second pair of manifolds form a quadrilateral support structure with each fluid manifold forming a side of the support structure.

5. The integrated heat exchanger of claim 4 wherein the first pair of manifolds are positioned on opposite sides of the support structure and are connected to the second pair of manifolds.

6. An integrated heat exchanger, comprising:
a first heat exchange core adapted for cooling a first heat exchange fluid;
a second heat exchange core adapted for cooling a second heat exchange fluid; and
an integrated, peripheral, quadrilateral support structure supporting the heat exchange cores on a motor vehicle frame, the support structure including:
a first pair of hollow fluid manifolds supporting the first and second heat exchange cores and communicating with the first heat exchange core to allow the first heat exchange fluid to pass between the first pair of fluid manifolds and the first heat exchange core; and
a second pair of hollow fluid manifolds supporting the first and second heat exchange cores and communicating with the second heat exchange core to allow the second heat exchange fluid to pass between the second pair of fluid manifolds and the second heat exchange core, with each fluid manifold of the first and second pairs of fluid manifolds forming a side of the support structure and extending from one fluid manifold to another fluid manifold.

7. The integrated heat exchanger of claim 6 wherein the first heat exchange core is a coolant radiator core adapted to use a liquid as the first heat exchange fluid.

8. The integrated heat exchanger of claim 7 wherein the second heat exchange core is a charge air cooler core adapted to use compressed gas as the second heat exchange fluid.

9. The integrated heat exchanger of claim 8 wherein the coolant radiator core has a perimeter that defines a front face of the coolant radiator core, the charge air cooler core is positioned in front of the coolant radiator core, and the second pair of fluid manifolds is positioned outside of the perimeter of the coolant radiator core.

10. The integrated heat exchanger of claim 6 wherein the fluid manifolds of the first pair of fluid manifolds are positioned on opposite sides of the support structure and extend from a first fluid manifold to a second fluid manifold of the second pair of fluid manifolds.

11. The integrated heat exchanger of claim 6 wherein the second heat exchange core is positioned in front of the first heat exchange core.

* * * * *